United States Patent [19]

Spengler

[11] Patent Number: 5,718,791
[45] Date of Patent: Feb. 17, 1998

[54] METHOD OF LAMINATING A TRIM PANEL AND FOLDING A COVER SHEET EDGE AROUND THE PANEL RIM

[75] Inventor: Gerhard Spengler, Frankfurt, Germany

[73] Assignee: R + S Stanztechnik GmbH, Offenbach, Germany

[21] Appl. No.: 462,200

[22] Filed: Jun. 5, 1995

[51] Int. Cl.$^6$ .................................................. B32B 31/20
[52] U.S. Cl. ........................... 156/212; 156/216; 156/479; 100/269.07
[58] Field of Search ........................... 156/212, 214, 156/216, 483, 484, 475, 290, 275.1, 275.7, 285, 308.4, 580, 581, 494, 261, 583.3, 479; 100/264, 269.07

[56] References Cited

U.S. PATENT DOCUMENTS

| | | |
|---|---|---|
| 3,075,862 | 1/1963 | Hoyer . |
| 4,243,456 | 1/1981 | Cesano ........................ 156/214 |
| 4,323,406 | 4/1982 | Morello . |
| 4,465,534 | 8/1984 | Zelkowitz . |
| 4,617,081 | 10/1986 | Bleau et al. . |
| 4,634,483 | 1/1987 | Spengler . |
| 4,704,183 | 11/1987 | Sigerist ........................ 156/583.3 |
| 4,839,126 | 6/1989 | Griesdorn . |
| 5,193,265 | 3/1993 | Muggli et al. ........................ 156/212 |
| 5,238,515 | 8/1993 | Isalaco et al. ........................ 156/212 |
| 5,267,511 | 12/1993 | Noel et al. ........................ 100/264 |
| 5,324,384 | 6/1994 | Spengler ........................ 156/212 |

FOREIGN PATENT DOCUMENTS 1337903  8/1963  France .

Primary Examiner—Michael W. Ball
Assistant Examiner—Michael A. Tolin
Attorney, Agent, or Firm—W. G. Fasse; W. F. Fasse

[57] ABSTRACT

An improved method and apparatus for laminating a cover sheet onto a substrate, and folding and laminating the cover sheet edges around the back side of the substrate rim are especially suited to making finished trim panels having a strongly contoured three-dimensional configuration. A carrier frame holds the cover sheet material with a desired tension until the lamination has begun, to avoid wrinkling and sagging of the cover sheet material on a strongly contoured three-dimensional substrate. A lower mold receives the substrate, while an upper mold laminates the cover sheet onto the substrate. The upper mold can be retracted into or extended from a frame that forms a nest, while edge-folding tools are laterally movably arranged around the perimeter of the upper mold nest. The lamination and molding is initiated with the upper mold extended beyond or below the plane of the edge-folding tools and the cover sheet still held by the carrier frame, and then the two molds together are retracted above the plane of the edge-folding tools to begin the edge-folding step.

23 Claims, 8 Drawing Sheets

FIG. 2
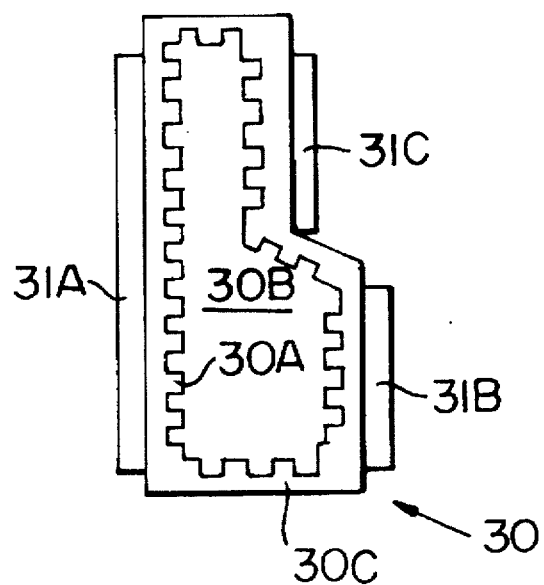
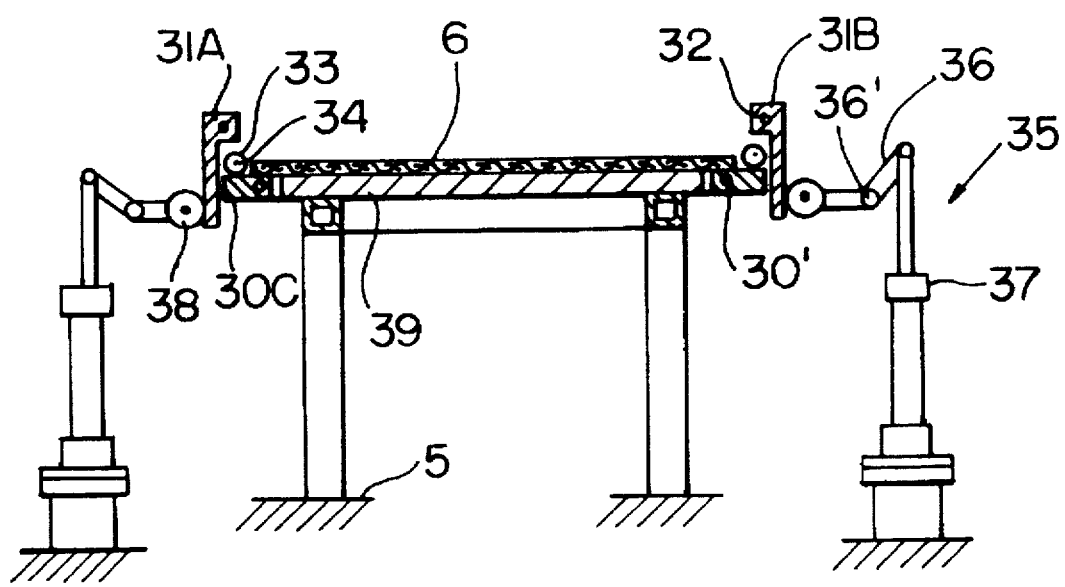
FIG. 3

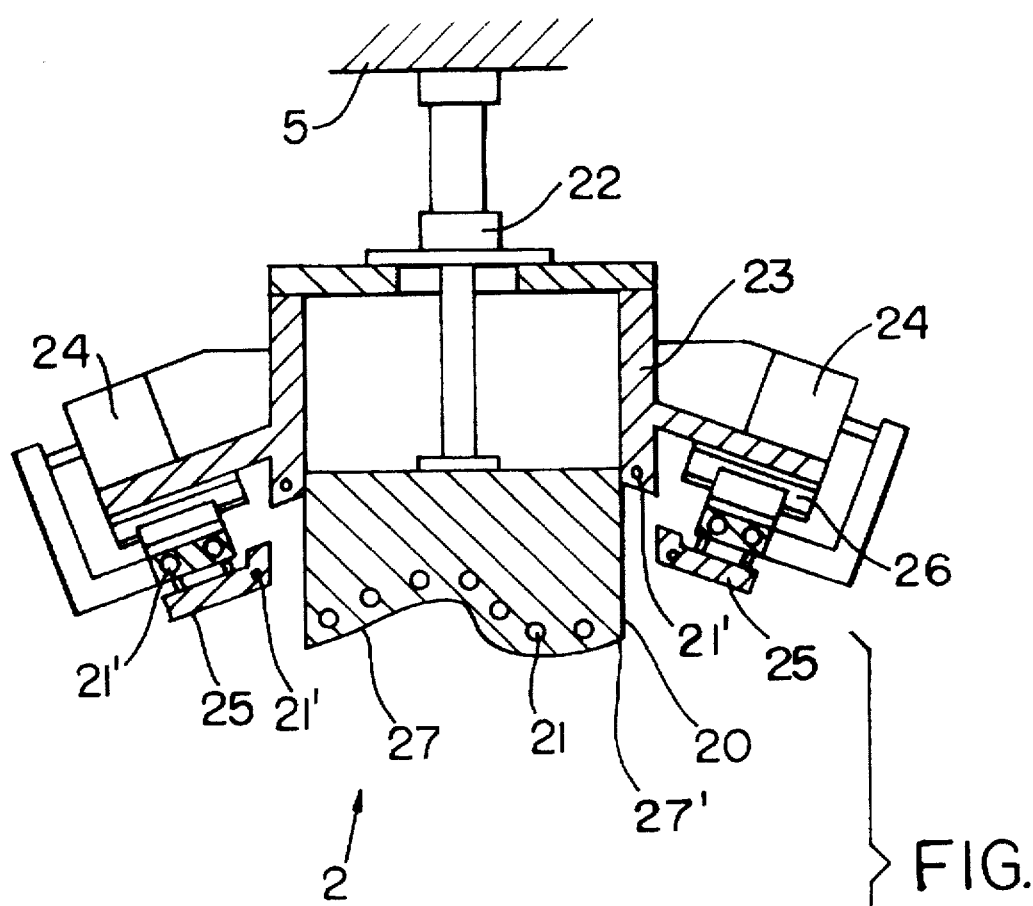
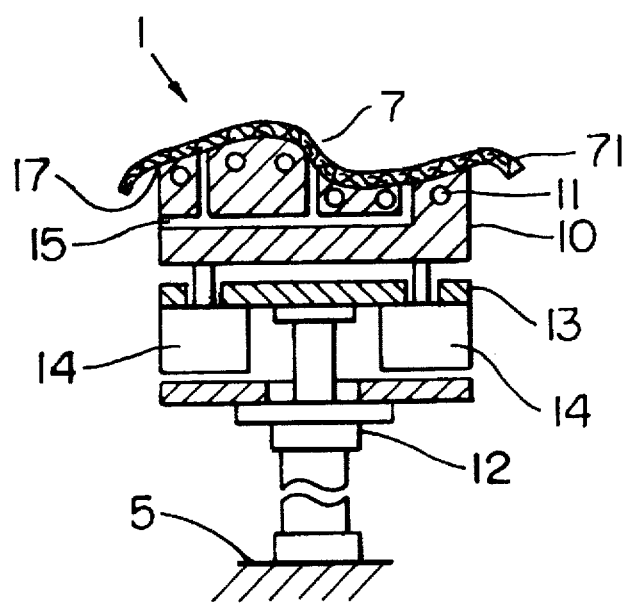
FIG. 4

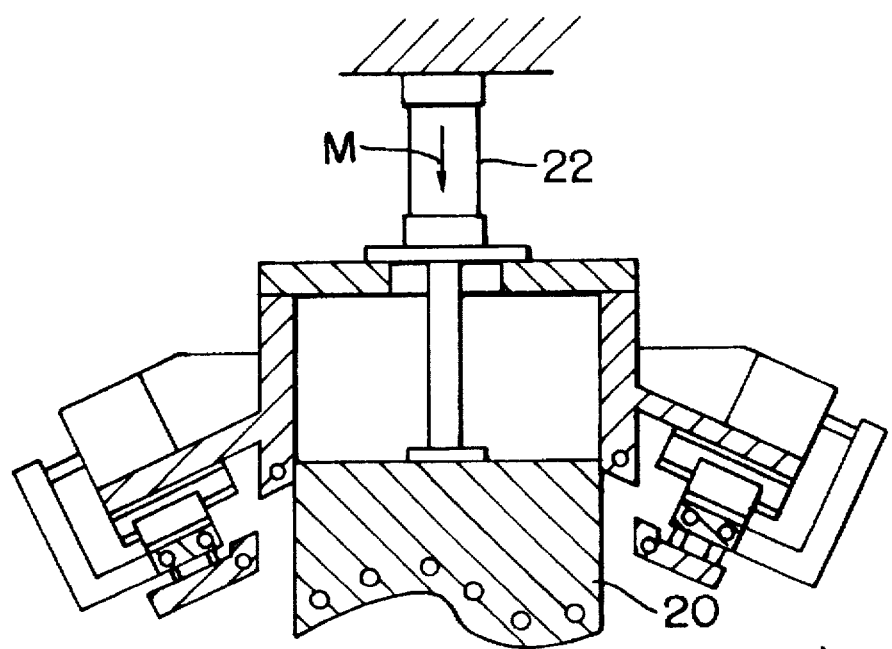
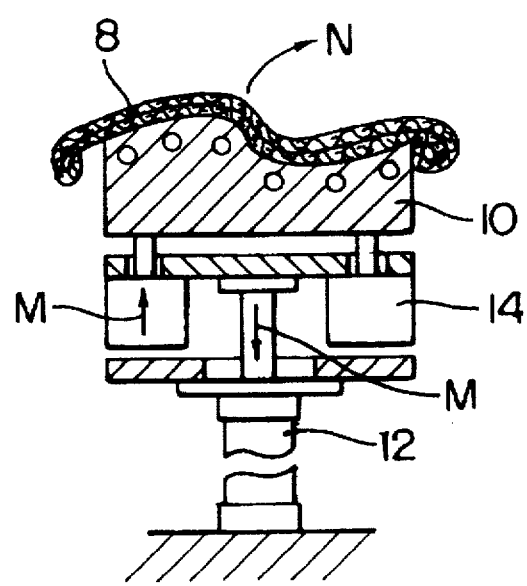
FIG. 10

METHOD OF LAMINATING A TRIM PANEL AND FOLDING A COVER SHEET EDGE AROUND THE PANEL RIM

FIELD OF THE INVENTION

The invention relates to a method and an apparatus for producing a trim panel including a substrate and a cover sheet laminated onto the substrate, with a cover sheet edge folded around a substrate rim.

BACKGROUND INFORMATION

Trim panels of this type are used, for example, to cover the inner surfaces of automobile doors. The trim panels conventionally comprise a substrate that forms a stiff backing and a decor cover sheet that itself may comprise several plies laminated to each other. The cover sheet is then laminated onto the substrate. The substrate may be made of various materials, for example synthetic plastic materials such as ABS or polypropylene, fiber board stock such as stock made of wood fibers or other natural fibers embedded in phenolic resin or the like, fiberglass panels, and the like. The cover sheet may be made of decorative cloth, leather, vinyl or similar materials, preferably bonded to a backing of a foam material, especially polyether foams, polyethylene foams, and the like. Many different materials and combinations of materials are known for use in such trim panels.

The laminating process usually involves the use of an adhesive applied onto the back surface of the cover sheet, and optionally heating the substrate and/or the adhesive before pressing and laminating the cover sheet and the substrate together. It has been a longstanding problem that the edges of the cover sheet cannot be neatly trimmed or folded around the edge rim of the substrate. It is desirable to fold the edges of the cover sheet around the substrate rim, to form a neat and clean edge for the trim panel while helping to prevent unravelling or unlaminating of the cover sheet from the substrate at the edges of the trim panel.

U.S. Pat. No. 5,324,384 (Spengler), issued Jun. 28, 1994, provides an effective solution to the above mentioned problem. For example, U.S. Pat. No. 5,324,384 provides an apparatus for forming trim panels having an upper mold, a lower mold, and edge-folding tools provided around the edges of the lower mold. A substrate is held by vacuum on the upper mold. A cover sheet is laid across the edge-folding tools and the lower mold. The upper mold moves relative to the lower mold to laminate the substrate and the cover sheet together, and the lower mold moves into a recessed position relative to a plane of the edge-folding tools. Then, the edge-folding tools move behind the lower mold so as to fold the cover sheet edge around the rim of the substrate and onto the back of the substrate. The lower mold then moves upward toward the edge-folding tool to press the cover sheet edge against the back of the substrate.

An apparatus according to U.S. Pat. No. 5,324,384 has been found to be suitable and effective for its intended purpose, but the inventor has found that certain improvements are possible. The present application is directed to an improvement over the invention of U.S. Pat. No. 5,324,384. The entire disclosure of U.S. Pat. No. 5,324,384 is incorporated herein by reference, and should be referred to for a detailed description of features common to the present invention and the prior patent.

It has been found that the method and apparatus disclosed by U.S. Pat. No. 5,324,384 are not very well suited for laminating and edge-folding trim panels having a sharply contoured three-dimensional shape. If the molds, and the substrate, are too strongly contoured in a three-dimensional shape, it has been found that the decor cover sheet can sink unevenly into the depressions of the lower mold, whereupon folds and wrinkles may be formed in the cover sheet when it is laminated onto the substrate. Furthermore, since the decor cover sheet is not held under tension, but rather lays loosely on the loading surface formed by the upper surface of the edge-folding tools, the cover sheet is pulled easily from the loading surface when the upper mold moves downward and passes through the plane of the cover sheet. This can also lead to wrinkling or crumpling of the cover sheet material.

It was also found that the ease of loading the substrate onto the upper mold, where it would be held by vacuum, could be improved, for example by loading the substrate onto a lower mold and making further necessary structural changes. The functionality, durability, and operability of the apparatus could also be improved, for example by avoiding passive, resiliently yielding elements such as springs for applying an edge-folding force.

OBJECTS OF THE INVENTION

In view of the above it is the aim of the invention to achieve the objects recited in U.S. Pat. No. 5,324,384, and the following further objects, singly or in combination:

to provide a method and an apparatus especially suitable for making sharply contoured three-dimensional trim panels, by laminating and three-dimensionally molding a cover sheet onto a substrate and folding and bonding the cover sheet edges around a rim of the substrate;

to avoid the wrinkling or crumpling of a cover sheet being laminated onto a substrate in such a method and apparatus, by holding the cover sheet with a controlled tension until lamination has begun;

to improve the ease of loading a substrate onto a mold in such a method and apparatus;

to simplify the operation of such a method, and to simplify the structure and reduce the size of such an apparatus;

to actively drive a mold that will contact the cover sheet to a position out beyond the plane of the edge-folding tools to begin lamination and then to retract the mold behind the plane of the edge-folding tools to complete the lamination and carry out the edge-folding in such a method and apparatus;

to allow blanks of cover sheet stock that have been pre-cut and pre-trimmed, and even pre-formed, to be used in such a method and apparatus, and to avoid the need of trimming after the lamination and edge-folding is completed;

to provide additional actuators such as piston cylinder devices for finally tuning the laminating and edge-folding forces and simplifying the operating cycle; and to provide a particularly advantageous carrier frame for holding the cover sheet.

SUMMARY OF THE INVENTION

The above objects have been achieved in an apparatus according to the invention, which includes a first mold, a second mold, a carrier frame, an edge-folding tool, and respective drives for the molds and for the edge-folding tool. The first mold has a mold surface adapted to receive a substrate, which may have a sharply contoured three-dimensional shape. A first primary actuator, such as a piston cylinder device, drives the first mold relatively toward and away from the second mold. Preferably, secondary actuators, such as piston cylinder devices, are connected between the first mold and the first primary actuator, to apply an additional, fine tuned, motive force to the first mold toward or away from the second mold as desired.

The second mold has a three-dimensionally contoured mold surface substantially mating with the mold surface of the first mold. A second primary actuator, such as a piston cylinder device, drives the second mold relatively toward or away from the first mold as desired. The edge-folding tool is driven by an edge-folding actuator in a direction having at least a direction component perpendicular to the direction of motion of the second primary actuator, i. e. the direction of motion of the second mold. The second primary actuator is adapted to move the second mold a sufficient distance relative to the edge-folding tool that the second mold surface is retracted behind a plane of the edge-folding tool in a retracted position, but extended beyond the plane of the edge-folding tool in an extended position.

The apparatus preferably further includes a heater and a carrier frame loading station. Gripper members, such as clamp bars, are mounted on the carrier frame and are adapted to hold a cover sheet on the carrier frame with a desired tension. The carrier frame and the heater are respectively each adapted and arranged to be moved into positions between the first and second molds, so that the carrier frame holds the cover sheet adjacent the second mold surface, and the heater is positioned between the cover sheet and the substrate, which is mounted on the first mold surface. The first primary actuator is adapted to drive the first mold through the carrier frame to contact the substrate with the cover sheet and then laminate the substrate and cover sheet between the first mold and the second mold while pulling the cover sheet from the carrier frame.

The above objects have also been achieved in a method according to the invention wherein a cover sheet is held on a carrier frame with a desired tension. The cover sheet is preferably loaded onto the carrier frame in a loading station, from where the frame is then moved into a position between first and second molds. A substrate is arranged on a mold surface of the first mold. A heater is preferably moved into a position between the cover sheet and the substrate. After the cover sheet and the substrate have been heated to proper temperatures for carrying out the laminating, the heater is again retracted. Next, the first mold is driven through the central open area of the carrier frame, so that the substrate mounted on the first mold contacts the cover sheet, and then the cover sheet and the substrate are pressed together between the molds, whereupon the molding and laminating begins.

The first mold is driven further to pull the cover sheet free from the carrier frame and continue the lamination against the second mold. The first and second molds together are retracted behind the plane of edge-folding tools, and then the edge-folding tools are extended in a direction with a component perpendicular to the direction of travel of the first and second molds, so as to fold an edge of the cover sheet behind the rim of the substrate. Next, the first and second molds together are moved again in the opposite direction, i.e. slightly out of the retracted position, so that the edge-folding tools reach behind the substrate rim so as to tuck and bond the cover sheet edges onto the back side of the substrate. Finally, the molds are driven again into the retracted position so that the edge-folding tools can be retracted, the molds can be returned to the starting positions, and the finished trim panel can be removed from the first mold.

BRIEF DESCRIPTION OF THE DRAWINGS

In order that the invention may be clearly understood, it will now be described, by way of example, with reference to the accompanying drawings, wherein:

FIG. 2 is a detail plan view of a carrier frame according to the invention taken in the direction of arrow II in FIG. 1;

FIG. 3 is a cross-section showing a cover sheet material being loaded onto a carrier frame in a carrier frame loading station according to the invention;

FIG. 4 is a cross-section of a first mold group, forming a lower mold group, and a second mold group, forming an upper mold group, according to the invention;

FIG. 10 is a cross-section showing the first and second molds returned to their starting positions with a finished trim panel held on the first mold.

DETAILED DESCRIPTION OF PREFERRED EXAMPLE EMBODIMENTS AND OF THE BEST MODE OF THE INVENTION

Figure 1:
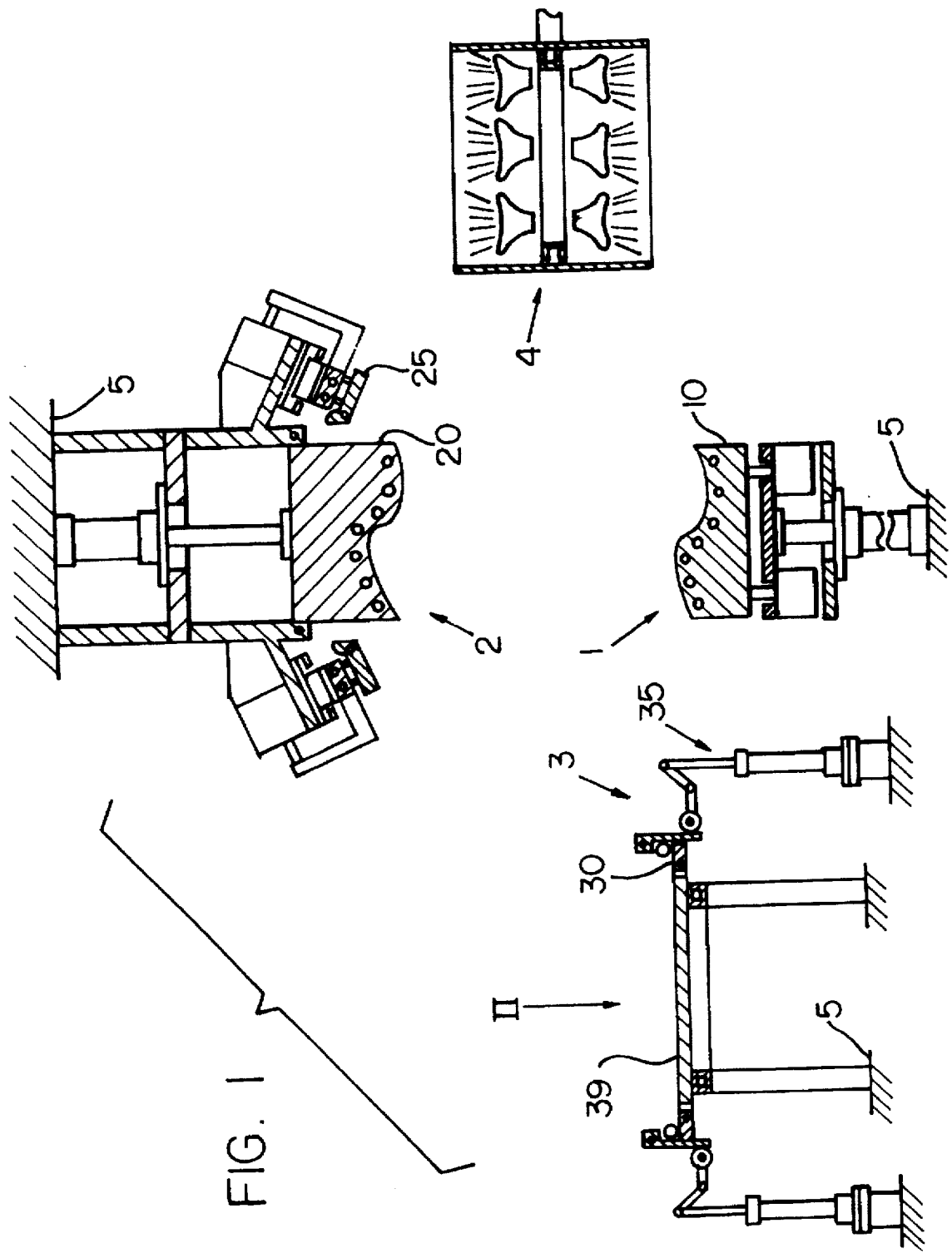
FIG. 1 is a schematic cross-section giving a general overview of the several components according to the invention.

As shown generally in FIG. 1, the apparatus according to the invention includes a first mold group 1, a second mold group 2, a carrier frame loading station 3, and a heater 4. As shown, various components are mounted on a machine frame 5, which is indicated only schematically, but could be in any form generally understood in the art. In the specific embodiment described herein, the first mold group 1 forms a lower mold group, and the second mold group 2 forms an upper mold group. The two mold groups form a molding station for molding and laminating a cover sheet onto a three-dimensionally contoured substrate and then folding the edges of the cover sheet around a rim of the substrate. Furthermore, a rim portion of the substrate may also be folded back together with the cover sheet to form a brim around the panel rim, as described in greater detail in U.S. Pat. No. 5,324,384, referenced above.

The first mold group 1 includes a first mold 10, which is a lower mold 10 in this embodiment. The second mold group 2 includes a second or upper mold 20 and edge-folding tools 25. The carrier frame loading station 3 includes a cover stock or cover sheet loading table 39, and clamp opening devices 35 arranged adjacent the loading table 39. A carrier frame 30 is provided to carry a cover sheet, and is arranged to be movable between a first position at the loading table 39, and a second position between the first mold group 1 and the second mold group 2. The carrier frame 30 may be moved by any conventional mechanism, as would be understood by a person of ordinary skill in the art. The heater 4 is also arranged to be movable relative to the machine frame 5, by any conventional means, so that the heater can be moved into and out of a position between the first mold group 1 and the second mold group 2.

With reference to FIGS. 2 and 3, the carrier frame 30 preferably comprises a perimeter frame 30C and clamp bars 31A, 31B, and 31C, for example, which clamp the cover sheet against the carrier frame 30 with the desired holding tension. To achieve this, the clamp bars 31 are connected by respective clamp hinges 34 to the perimeter frame 30C, whereby respective clamping springs 33, such as circumferentially active helical springs, are arranged to constantly urge or bias the clamp bars 31 in a direction to clamp against the perimeter frame 30C. Other embodiments of the clamp bars are possible, for example the clamp bars may be connected to the carrier frame by a spring-biased linear slide member rather than a hinge.

In the view of FIG. 3, the carrier frame 30 has been positioned in a plane parallel with the cover sheet loading table 39, and a cover sheet 6 has been laid onto the table 39 and carrier frame 30. The frame 30 and the table 39 are preferably aligned flush with each other to form a planar loading surface, so that the table 39 will support the cover sheet to avoid sagging or wrinkling while it is being loaded. The carrier frame 30 and the loading table 39 are shown as substantially flat planar components, because the cover sheet 6 is a flat sheet in this example. However, it is also possible to use cover sheets that have been at least partially three-dimensionally pre-formed or pre-molded, whereby an appropriately shaped carrier frame would be used. Also, the outer edges of the cover sheet 6 have been pretrimmed to an appropriate shape for the finished trim panel.

FIG. 3 shows a state in which clamp bars 31 have been opened to receive the cover sheet 6. To achieve this, piston cylinder devices 37 of the clamp opening devices 35 are extended. As a result, pivot levers 36 are tilted about respective pivot fulcrums 36' toward the clamp bars 31. A roller 38 is preferably provided on an outboard or free end of each pivot lever 36, to contact and depress an extending edge portion of each clamp bar 31, to rotate the clamp bars around their hinges 34 against the force of the clamping springs 33. Once the clamp bars 31 have been opened, the cover sheet 6 may be arranged on the carrier frame 30 as described above, either manually or by a mechanized conveyor.

Cooling ducts 30' are preferably provided in the perimeter frame 30C, and cooling ducts 32 are preferably provided in the clamp bars 31. A cooling fluid may be circulated through the cooling ducts to cool the components and avoid overheating during repeated operating cycles involving a heating step as discussed below.

As shown in FIG. 2, a central open area 30B is provided in the center area of the carrier frame 30. The edges of the perimeter frame 30C bounding the central open area 30B include fingers or serrations 30A, having any desired serration form, but preferably having a square serrated form as shown. The serrations 30A serve two functions. First, the serrations 30A ensure that the perimeter frame 30C has a sufficient contact area against which the clamping bars 31A, 31B, and 31C clamp the cover sheet 6 to provide an adequate gripping of the cover sheet. Secondly, the openings between the serrations 30A expose alternating areas along the edge of the cover sheet 6, so that these exposed areas can be heated, as described below, for activating the adhesive that has been pre-applied on the back surface of the cover sheet. In this manner, good adhesion of the cover sheet edge onto the back of the substrate rim can be ensured, because at least alternating patches of adhesive along the sheet edge will be properly heat activated. The particular dimensions and shape of the serrations 30A can be selected according to the particular materials being used. Good results have been achieved with serration fingers having a minimum width of about 6 mm but preferably about 10 to 40 mm, and gaps between serration fingers of about 10 to 40 mm. Furthermore, the cover sheet or the carrier frame can be dimensioned so that the cover sheet edges protrude somewhat (e.g. 5 to 10 mm) beyond the outer edges of the perimeter frame to expose an edge band to be heated.

As shown in FIG. 4, a substrate 7 has been placed onto the first or lower mold 10, either manually or by an appropriate conveyor device. The first mold 10 has a first mold surface 17 with a shape corresponding to the intended finished three-dimensional contour of the substrate 7. For convenience of loading, the first mold surface 17 should be at about the same height as the loading table 39 described above. It should be understood, that the positions of the first mold group 1 and the second mold group 2 can be reversed, so that the first mold group 1 would be a lower mold group. However, the embodiment shown in the present drawings is preferred for ease of loading a substrate 7 onto, and removing finished trim panels from, the first mold 10.

The substrate 7 is preferably at least partially pre-formed and pre-molded to have a relatively strongly three-dimensionally contoured shape. For example, the substrate may have a strongly contoured three-dimensional finished shape having a change in contour height of at least 2 cm over the area of the substrate, and especially even a change in contour height of at least 5 cm over the substrate. In order to hold the substrate 7 firmly in place, vacuum ducts 15 may be incorporated into the first mold 10 with corresponding vacuum ports opening through the first mold surface 17. For the sake of clarity, the vacuum ducts are omitted in the other figures. Cooling conduits 11 are preferably incorporated into the first mold 10, so that a cooling fluid can be circulated through the mold to prevent it from overheating in a continuous operating cycle, and to help cure or harden the lamination adhesive.

The first mold 10 is connected to and supported on a mold platform 13, which in turn is connected to the piston rod of a first primary piston cylinder device 12. The first primary piston cylinder device 12 has a relatively long operating stroke and can be hydraulically or pneumatically actuated to raise and lower the first mold 10 relative to the machine frame 5. The actuation of the piston cylinder device 12 is controlled in a manner to carry out the operating cycle as described below. Preferably, secondary molding piston cylinder devices 14 are interposed between the first mold 10 and the mold platform 13. For example, the mold 10 is connected to the piston rods and the platform 13 is connected to the cylinder housings of the secondary piston cylinder devices 14. The devices 14 have a relatively short stroke or throw, and can be actuated pneumatically or hydraulically for carrying out short throw or finely tuned steps of the operating cycle as described below.

Further referring to FIG. 4, the second or upper mold 20 has a second mold surface 27 that has a three-dimensional contour substantially mating with that of the mold surface 17 of the first mold 10. Cooling ducts 21 may be incorporated into the second mold 20, for allowing circulation of a cooling fluid, similarly to the first mold 10. Additional cooling ducts 21' are preferably provided in the other tool components that are also subjected to heating during operation.

The second mold 20 is connected to the piston rod of a second primary piston cylinder device 22. A second mold frame 23, which is connected to the cylinder housing of the piston cylinder device 22, and preferably also to the machine frame 5, forms a mold nest into which the second mold 20 can be retracted. In other words, the piston cylinder device 22 can be pneumatically or hydraulically actuated to drive the mold 20 into or out of the mold nest formed by the frame 23. Especially, the mold 20 can be retracted so that the mold surface 27 is substantially flush with the end face edges of the frame 23 (see e.g. FIG. 8). On the other hand, the second mold 20 can be driven out of the nest formed by the frame 23 to a sufficient extent that the mold surface 27 protrudes beyond, in this case below, an edge-folding plane defined between the edge-folding tools described next.

Edge-folding tools 25 are provided substantially around the perimeter of the mold 20, that is to say, about the frame 23. The edge-folding tools 25 are movably mounted on slide rails 26, and are connected to edge-folding piston cylinder devices 24, which can drive the edge-folding tools 25 laterally toward and away from the mold 20 to carry out an edge-folding operation as described below. The slide rails 26 are preferably arranged at an inclined angle relative to the mold frame 23 and relative to the axis of the piston cylinder device 22. Thereby, the edge-folding devices 25 are movable toward or away from the mold 20 in directions nearly perpendicular to the direction of motion of the mold 20, but having a directional component parallel to the axis of the piston cylinder device 22 as well, so that the edge-folding tools can better reach behind a curved edge rim of the substrate as described below. The particular construction and operation of various edge-folding tools that can be used are described in the above mentioned U.S. Pat. No. 5,324,384.

Figure 5:
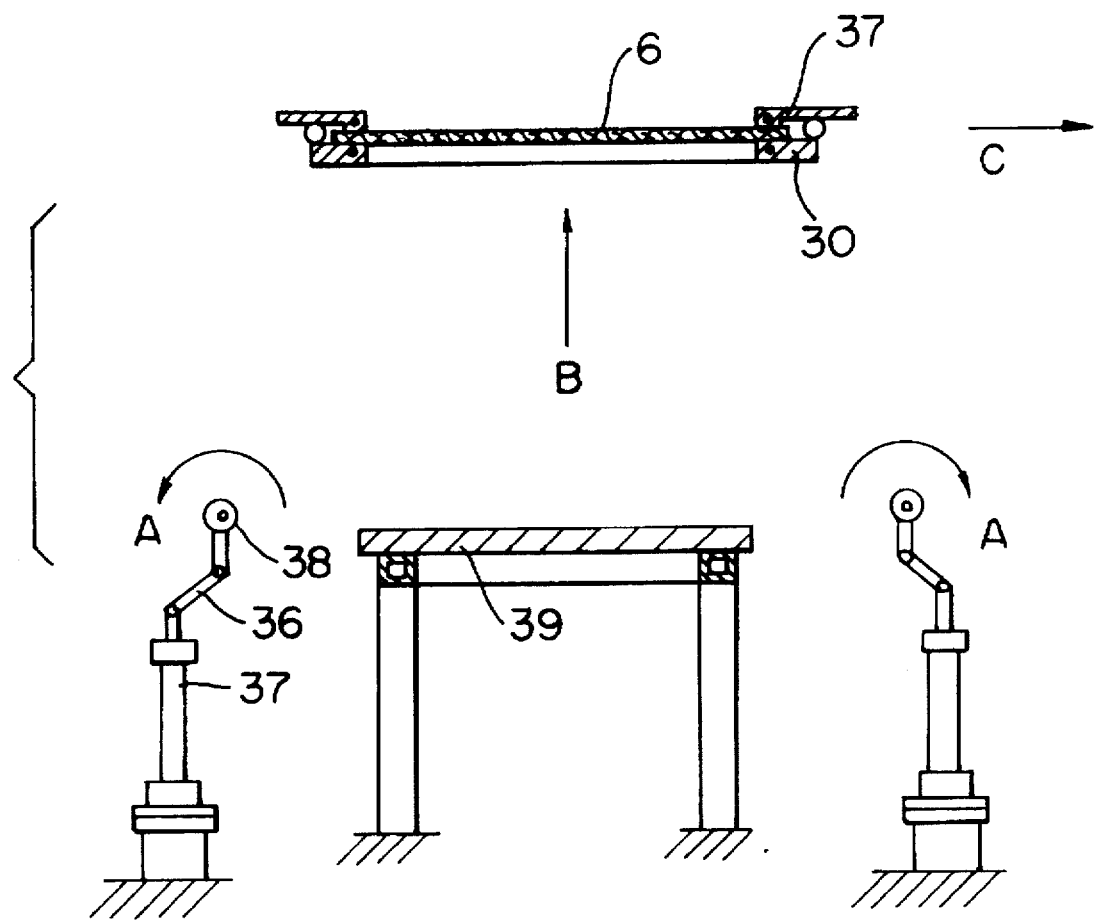
FIG. 5 is a cross-section showing an intermediate state of the carrier frame being moved from the loading station to a position between the mold groups.

FIG. 5 shows a sequence of steps involved in clamping the cover sheet 6 onto the carrier frame 30 and moving it into position between the first and second mold groups. First, as shown by the arrow A, the piston cylinder devices 37 are retracted so as to rotate the pivot levers 36 and lift the rollers 38 away from the clamp bars 31 of the carrier frame 30. The spring tension of the clamping springs 33 causes the clamp bars 31 to clamp the cover sheet 6 firmly against the perimeter frame 30C of the carrier frame 30. Next, as shown by the arrow B, the loaded carrier frame 30 is lifted away from the loading table 39 and the loading station 3. Finally, as shown by arrow C, the loaded carrier frame 30 is moved into a position between the upper mold group 2 and the lower mold group 1, closer to the upper mold group 2. The carrier frame 30 is carried and moved by a drive mechanism which is not shown, but can be any mechanism known by a person of ordinary skill in the art.

Figure 6:
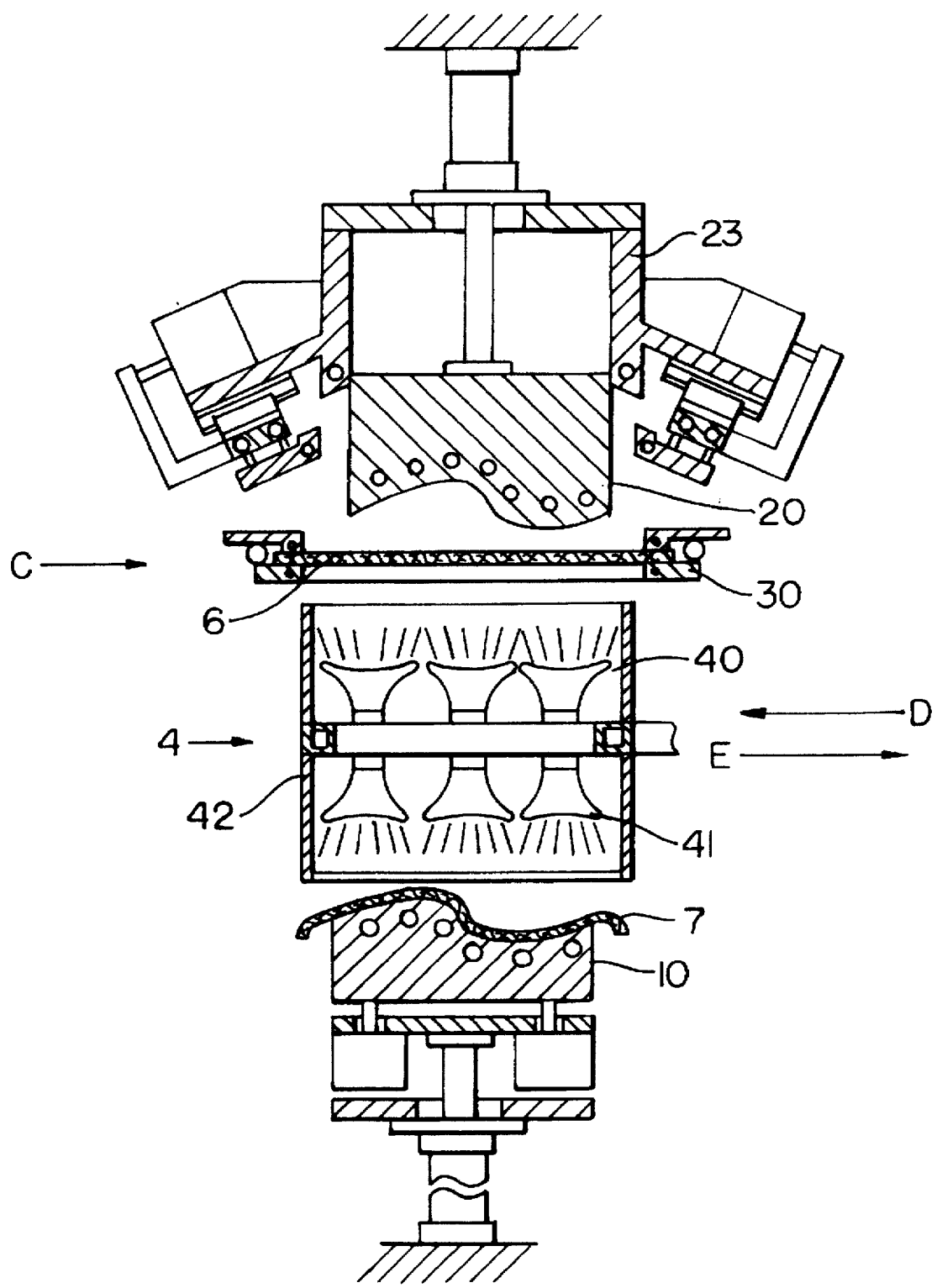
FIG. 6 is a cross-section showing the carrier frame and a heater moved into positions between the upper and lower mold groups.

Referring now to FIG. 6, the carrier frame 30 has been moved into position as described above and shown by the arrow C. Preferably substantially simultaneously therewith, the heater 4 is moved into position between the carrier frame 30 and the first mold 10, as shown by the arrow D. An upper bank of heaters 40 thus heats the lower surface of the cover sheet 6, which may, for example, be a foam backing surface and may include a heat activatable adhesive that has been applied thereon (see e.g. U.S. Pat. No. 5,324,384). A lower bank of heaters 41 heats the upper surface of the substrate 7. The upper and lower banks of heaters 40 and 41 are mounted on a suitable frame 42, and are preferably separately controllable to differentially heat the cover sheet 6 and the substrate 7, depending upon the particular materials chosen for the cover sheet 6 and the substrate 7. The heaters can be any suitable type of heater, but preferably comprise radiant heaters such as infrared heaters. After a sufficient heating has been accomplished, the heater unit 4 will be retracted to a waiting position clear of the molds 10 and 20 as shown by the arrow E. As an alternative embodiment, the heaters may be stationary, and the substrate and cover sheet may be moved past the heaters.

During the heating step, most of the back surface of the cover sheet 6 is directly exposed to the infrared heat through the central open area 30B of the carrier frame 30. Furthermore, alternating patches around the edge of the cover sheet 6 are also exposed to the infrared heating through the gaps between the square-shaped serrations 30A of the carrier frame 30. In this manner, it is ensured that the heat activatable adhesive on the back surface of the cover sheet 6 is sufficiently uniformly and well activated, even immediately along the edge of the cover sheet 6. Even though the areas of the cover sheet edge held behind and thus masked by the serrations 30A of the carrier frame 30 will not be directly heated, the open areas between the serrations 30A allow a sufficient activation of the adhesive to ensure proper adhesion of the cover sheet edges onto the back rim of the substrate when the edge-folding operation is carried out. During the heating step, cooling fluid is preferably circulated through the cooling conduits 11 of the mold 10 to protect the outer surface of the substrate 7 from being overheated. Similarly, cooling fluid is circulated through the cooling conduits 30' and 32 of the carrier frame 30, and cooling air is blown onto the upper surface of the cover sheet 6, to protect the cover sheet, and especially its outer surface, from damage due to excessive heating. In the following lamination steps, cooling fluid will be circulated through the cooling conduits 11, 21 and 21' to cool and set the lamination and help cure or harden the adhesive.

Figure 7:
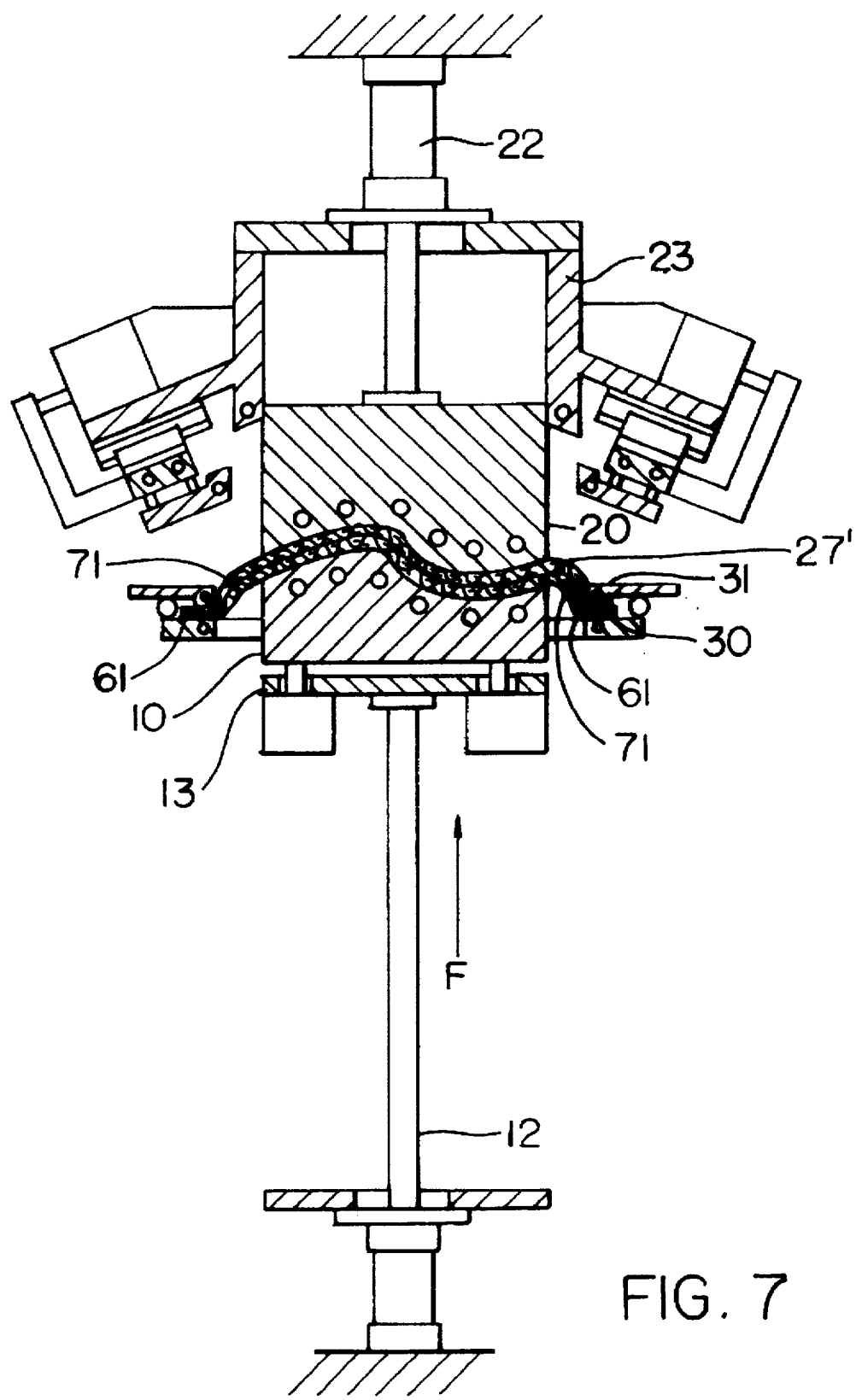
FIG. 7 is a cross-section showing the beginning of lamination of the cover sheet onto a substrate between the first and second molds as the cover sheet is being pulled from the carrier frame.

In FIG. 7, the first or lower mold 10 has been driven upward by the first primary piston cylinder device 12. Namely, the piston of the piston cylinder device 12 has been extended to raise the mold platform 13, thereby raising the mold 10. The first mold 10 has thus carried the substrate 7 through the central open area 30B of the carrier frame 30, so that the substrate 7 has been pushed against the cover sheet 6. The cover sheet 6 is still held with a desired tension in the carrier frame 30, but the cover sheet edges 61, which extend beyond the substrate rim 71, have begun to slip or be pulled from the clamp bars 31 of the carrier frame 30. At this point, the second or upper mold 20 is in its most-extended initial position, and the substrate 7 and the cover sheet 6 are sandwiched together between the two molds, so that the lamination and molding of the cover sheet 6 onto the substrate 7 begins while the carrier frame 30 is still holding the cover sheet 6 with a desired tension. Thus, the cover sheet 6 is uniformly and smoothly laminated and molded onto the substrate 7, without wrinkling, sagging or otherwise undesirably deforming. The initial laminating and molding has taken place with the second mold surface 27 extended below the plane of the edge-folding tools, so that the carrier frame 30 may still hold the cover sheet 6 during the initial lamination.

As the first primary piston cylinder device 12 continues to push the mold 10 upward, as shown by arrow F in FIG. 7, the cover sheet edges 61 are pulled and partially pre-laminated onto the substrate edges 71 by the tension applied to the cover sheet 6 by the carrier frame 30. The cover sheet edges 61 are then completely pulled free from the carrier frame 30, as the first and second molds 10 and 20 together move upward while maintaining the required laminating pressure between the first and second molds 10 and 20. That is to say, the first primary piston cylinder device 12 is actuated to drive the molds upward, while the second primary piston cylinder device 22 applies a downward force resisting yet yielding to the upward movement, to the extent necessary to provide the required laminating pressure.

Figure 8:
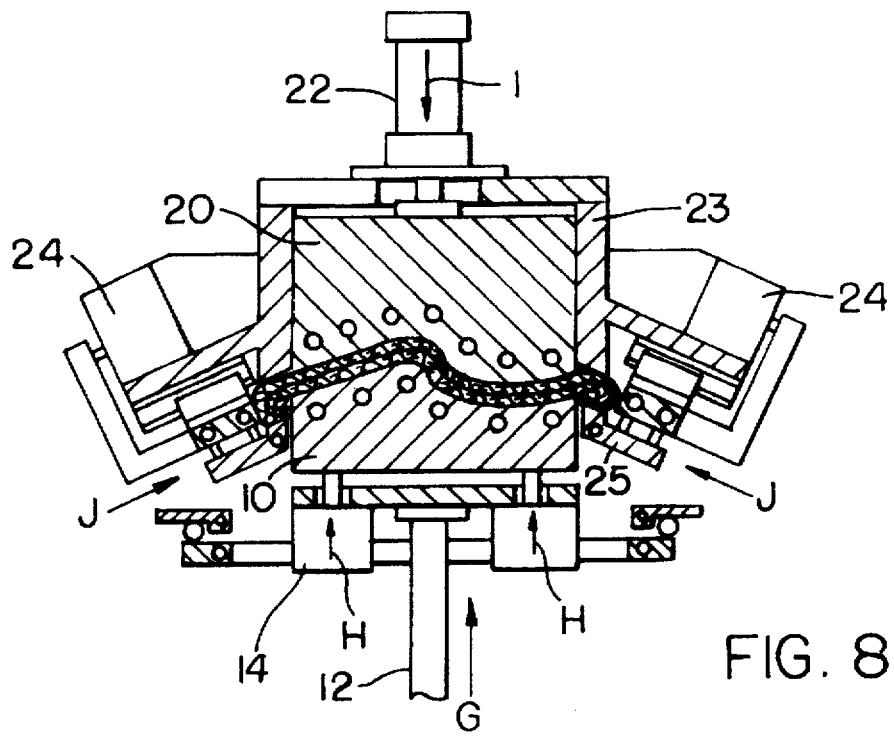
FIG. 8 is a cross-section showing continued lamination of the cover sheet onto the substrate and the first step of edge-folding tools folding the cover sheet edges around the rim of the substrate.

As shown in FIG. 8, the upward movement of the molds has continued until the second mold 20 is retracted into the nest formed by the mold frame 23, so that the molding plane or molding surface formed between the first mold 10 and the second mold 20 is retracted behind, or rather above, an edge-folding plane defined as extending between the edge-folding tools 25 perpendicularly to the direction of motion of the molds. The upward molding pressure of the first primary piston cylinder device 12 is continued, as shown by arrow G, and the downward molding pressure of the second primary piston cylinder device 22 is continued as shown by arrow I. The secondary molding piston cylinder devices 14 may be pressurized as shown by arrows H, to fine tune the molding pressure while the laminating and molding of the cover sheet 6 and the substrate 7 progresses.

The particular sequence and pressure used for actuating the various piston cylinder devices can be adjusted as needed for particular situations. For example, the secondary molding piston cylinder devices 14 may start out in a fully extended position as already shown in FIG. 4, or may be pressurized and extended only at the time of carrying out the molding as shown in FIGS. 7 and/or 8. Alternatively, the secondary piston cylinder devices 14 may be omitted entirely, whereupon their function would be taken over by making fine-tuned adjustments in the pressurization of the first primary piston cylinder device 12.

While the laminating and molding of the cover sheet 6 and substrate 7 continue, the edge-folding piston cylinder devices 24 are actuated to move the edge-folding tools 25 inwardly toward the sides or edges of the first mold 10. Thereby, the edge-folding tools 25 fold the cover sheet edges 61 around the substrate edges or rim 71 as shown in FIG. 8.

Figure 9:
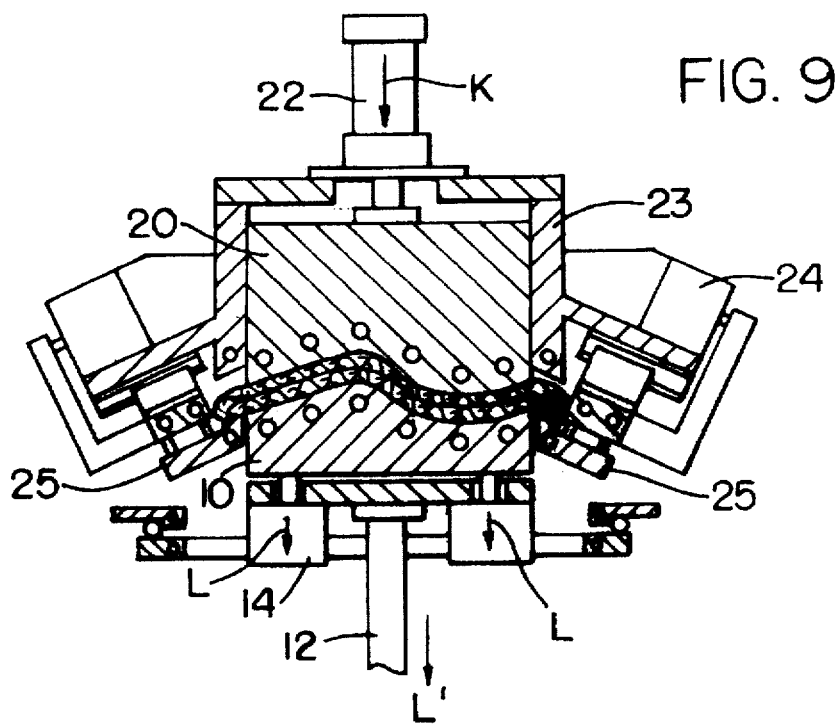
FIG. 9 is a cross-section showing continued lamination of the cover sheet onto the substrate and a second edge-folding step of tucking and laminating the cover sheet edges around and behind the substrate rim.

Next, as shown in FIG. 9, the second primary piston cylinder device 22 is extended as shown by arrow K while the secondary molding piston cylinder devices 14 and/or the first primary piston cylinder device 12 are retracted as shown by the arrows L and/or L'. Thus, the second mold 20 is pushed slightly out of the nest formed by the frame 23, and the molding plane or molding surface formed between the first mold 10 and the second mold 20 moves downward so that the substrate edge or rim 71 is pushed down against the edge-folding tools 25. Preferably, an edge zone 27' of the second mold surface 27 extends laterally beyond the first mold 10, so that the edge zone 27' provides a countersurface for the edge-folding tools 25 to press against. Thus, the edge-folding tools 25 reach behind the substrate rim 71 to laminate and mold the cover sheet edge 61 onto the back side of the substrate rim 71 to complete the edge-folding lamination. The particular operation and structure of various suitable edge-folding tools is described in greater detail in U.S. Pat. No. 5,324,384.

The pressures applied to the second primary piston cylinder device 22 on the one hand, and to the secondary molding piston cylinder devices 14 and the first primary piston cylinder device 12 on the other hand, are balanced or controlled to achieve the desired molding effect. For example, by substantially or completely relieving the upward molding force applied to the lower mold 10, substantially all of the downward molding force applied to the upper mold 20 will bear against the edge-folding tools 25 to achieve a high edge-folding lamination pressure. Alternatively, an upward force can be maintained on the lower mold 10 to continue the lamination and molding of the cover sheet 6 and the substrate 7 over the entire surface of the substrate, while the edge-folding and rim molding and lamination are simultaneously carried out with a desired, balanced rim pressure.

After the lamination is completed, the two molds are together moved upward slightly, to move the substrate rim 71 clear of the edge-folding tools 25, in an intermediate step not shown in the drawings. This allows the edge-folding tools 25 to be released and retracted. Then, the edge-folding piston cylinder devices 24 are actuated to move the edge-folding tools 25 away from the mold 10. Next, as shown by the arrows M in FIG. 10, the lower primary piston cylinder device 12 is again completely retracted, the secondary piston cylinder devices 14 are moved to their initial positions, and the upper primary piston cylinder device 22 is extended to move the upper mold 20 into its initial position. In the meantime, the carrier frame 30 has been returned to the loading station 3 into its initial position shown in FIGS. 1 and 3. Finally, the vacuum that had preferably been applied to the vacuum ducts 15 in the lower mold 10 to hold the substrate 7 is discontinued, so that the finished trim panel 8 can be removed from the lower mold 10 as shown by the arrow N, either manually or brought by a mechanized conveyor device. The finished trim panel 8 includes the cover sheet 6 molded and laminated onto the substrate 7, with the cover sheet edges 61 folded, tucked and laminated onto the back side of the substrate rim 71.

Although the invention has been described with reference to specific example embodiments, it will be appreciated that it is intended to cover all modifications and equivalents within the scope of the appended claims.

What is claimed is:

1. A method of producing a trim panel including a substrate and a cover sheet laminated onto said substrate with a cover sheet edge folded and laminated around a substrate rim in an apparatus including a first mold having a first mold surface, a second mold having a second mold surface, a carrier frame, and an edge-folding tool movable laterally relative to a direction of motion of said molds, said method comprising:

(a) disposing said substrate on said first mold surface;

(b) positively holding said cover sheet on said carrier frame at a position between said first mold surface and said second mold surface and spaced away from said edge-folding tool;

(c) moving at least one of said first mold and said second mold relatively toward each other until said substrate and said cover sheet are brought into contact with each other between said first mold surface and said second mold surface while continuing said holding of said cover sheet;

(d) applying a laminating pressure to said substrate and said cover sheet between said first and second mold surfaces while continuing said holding of said cover sheet, and releasing said cover sheet from said holding and moving said first and second molds toward said edge-folding tool in a first direction so that said substrate and said cover sheet together move toward said edge-folding tool and then cross from a first side to a second side of an edge-folding plane passing through said edge-folding tool perpendicularly to said first direction;

(e) moving said edge-folding tool laterally toward said molds to push said cover sheet edge around said substrate rim; and (f) moving said first and second molds relative to said edge-folding tool in a second direction opposite said first direction to move said substrate rim relatively toward said edge-folding tool so that said edge-folding tool laminates said cover sheet edge onto a back surface of said substrate rim.

2. The method of claim 1, further comprising after said step (f):
- (g) moving said first and second molds in said first direction to move said substrate rim away from and clear of said edge-folding tool;
- (h) moving said edge-folding tool laterally away from said molds;
- (i) moving at least one of said first and second molds relatively away from each other; and
- (j) removing said trim panel from said first mold surface.

3. The method of claim 1, further comprising heating said substrate and said cover sheet before said step (c).

4. The method of claim 3, wherein said heating step comprises moving a heater assembly into a position between said carrier frame and said first mold to carry out said heating, and then removing said heater assembly before said step (c).

5. The method of claim 3, wherein said carrier frame has non-contiguous open spaces therethrough, and wherein said heating step comprises heating at least a portion of said cover sheet edge in the form of non-contiguous areas along said cover sheet edge through said non-contiguous open spaces of said carrier frame.

6. The method of claim 1, further comprising loading said cover sheet onto said carrier frame at a loading station, engaging holding members to hold said cover sheet on said carrier frame, and moving said carrier frame to said position between said first mold surface and said second mold surface to carry out said step (b).

7. The method of claim 6, further comprising positioning said carrier frame around a loading table at said loading station so that said loading table is in a central open area of said carrier frame and so that a cover sheet supporting surface of said carrier frame is aligned substantially flush with a cover sheet supporting surface of said loading table.

8. The method of claim 1, further comprising moving said first mold through an open area of said carrier frame during said step (c).

9. The method of claim 1, further comprising contacting said cover sheet edge with said edge-folding tool during said step (d) to begin to fold said cover sheet edge over said substrate rim.

10. The method of claim 1, further comprising maintaining said laminating pressure between said first and second mold surfaces during said step (f).

11. The method of claim 1, further comprising reducing said laminating pressure between said first and second mold surfaces during said step (f) so that a molding force applied by said second mold achieves an increased edge-folding lamination pressure of said edge-folding tool against said cover sheet edge on said back surface of said substrate rim.

12. The method of claim 1, wherein said step (c) comprises extending a first primary piston-cylinder device connected to said first mold.

13. The method of claim 12, wherein said step (d) comprises further extending said first primary piston cylinder device and simultaneously retracting a second primary piston cylinder device connected to said second mold.

14. The method of claim 12, wherein said step (f) comprises retracting a secondary piston cylinder device operably interposed between said first primary piston cylinder device and said first mold.

15. The method of claim 1, wherein said first mold is a lower mold, said second mold is an upper mold, said step (c) comprises moving said first mold upwardly, said first direction of said step (d) is substantially vertically upward, and said second direction of said step (f) is substantially vertically downward.

16. The method of claim 1, wherein said step (e) comprises moving said edge-folding tool in a direction inclined at a non-perpendicular angle relative to said first direction.

17. The method of claim 1, further comprising applying a vacuum at said first mold surface to hold said substrate.

18. The method of claim 1, further comprising cooling said first mold, said second mold, said edge-folding tool and said carrier frame.

19. The method of claim 1, further comprising applying a heat-activatable adhesive to a surface of said cover sheet that is to be laminated in contact with said substrate, before said step (b).

20. The method of claim 1, wherein said step (c) comprises continuing said holding of said cover sheet until said substrate and said cover sheet are brought completely surfacially into contact with each other.

21. The method of claim 1, wherein said releasing of said cover sheet from said holding in said step (d) is achieved by and during said moving of said first and second molds in said first direction until said cover sheet is pulled free from said holding on said carrier frame.

22. The method of claim 1, wherein said carrier frame is maintained in said position of said step (b) throughout said steps (b), (c), (d), (e) and (f).

23. A method of producing a trim panel including a substrate and a cover sheet laminated onto said substrate with a cover sheet edge folded and laminated around a substrate rim in an apparatus including a first mold having a first mold surface, a second mold having a second mold surface, a carrier frame having non-contiguous open spaces therethrough, and an edge-folding tool movable laterally relative to a direction of motion of said molds, said method comprising:
- (a) disposing said substrate on said first mold surface;
- (b) holding said cover sheet on said carrier frame at a position between said first mold surface and said second mold surface;
- (C) heating said substrate and said cover sheet, including heating at least a portion of said cover sheet edge in the form of non-contiguous areas along said cover sheet edge through said non-contiguous open spaces of said carrier frame;
- (d) moving at least one of said first mold and said second mold relatively toward each other until said substrate and said cover sheet are brought into contact with each other between said first mold surface and said second mold surface while continuing said holding of said cover sheet;
- (e) applying a laminating pressure to said substrate and said cover sheet between said first and second mold surfaces, and moving said first and second molds relative to said edge-folding tool in a first direction so that said substrate rim crosses from a first side to a second side of an edge-folding plane passing through said edge-folding tool perpendicularly to said first direction;
- (f) moving said edge-folding tool laterally toward said molds to push said cover sheet edge around said substrate rim; and
- (g) moving said first and second molds relative to said edge folding tool in a second direction opposite said first direction to move said substrate rim relatively toward said edge-folding tool so that said edge-folding tool laminates said cover sheet edge onto a back surface of said substrate rim.

* * * * *